3,432,508
N-ALKYLATED PIPERIDINES
Stephen Wolownik, Waukegan, Ill., assignor to Abbott Laboratories, North Chicago, Ill., a corporation of Illinois
No Drawing. Filed Mar. 19, 1965, Ser. No. 441,340
U.S. Cl. 260—293.2            7 Claims
Int. Cl. C07d 29/10

ABSTRACT OF THE DISCLOSURE

Preparation of N-alkylated piperidines and N-alkylated C-substituted piperidines by hydrogenating a mixture of the corresponding pyridine with an aldehyde or a ketone in the presence of a palladium catalyst.

---

The present invention is directed to the preparation of piperidines and alkylpiperidines carrying a straight or branched alkyl radical at the nitrogen atom.

In the past, several routes have been suggested and used in the preparation of N-alkylated piperidines but these methods are all deficient in one or more of the following respects: they employ expensive starting materials, they lead to derivatives such as salts which are difficult to isolate from the reaction mixture, or the desired products are obtained in poor yields only.

It is thus an object of the present invention to prepare N-alkylated piperidines and N-alkylated C-alkyl-piperidines in an efficient process. It is another object to prepare said N-alkylated piperidines in high yields, using inexpensive and easily accessible starting materials. It is a further object of the present invention to provide a method which leads directly to the desired N-alkylated piperidines which can be isolated in a simple fashion from the reaction mixture.

These and other objects are accomplished by preparing N-alkylated piperidines and N-alkylated C-alkyl-piperidines comprising the steps of placing a mixture of a pyridine of the formula

wherein R is selected from the group consisting of hydrogen and loweralkyl and a carbonyl compound of the formula RCOR' wherein R is selected from the group consisting of hydrogen and loweralkyl and wherein R' is loweralkyl, in a closed system, and treating said mixture with gaseous hydrogen in the presence of metallic palladium at a total pressure of at least 15 p.s.i.g. and at a temperature between room temperature and below M, wherein M is the temperature at which the vapor pressure of the liquid reactants (vapor pressure of the combined liquid components) is equal to the total pressure in said closed system, until substantially no further hydrogen is absorbed. In this new process, the pyridine ring is hydrogenated to the piperidine ring and condensation takes place between the carbonyl group and the nitrogen of the heterocyclic ring, so that in a single operation the desired N-alkylated piperidine is obtained and can be isolated by removal of the catalyst by filtration or decantation.

The hydrogenation can be carried out at any pressure above 15 p.s.i.g., e.g. the pressure in the reaction vessel may be as high as 1000 atmospheres; however, one of the main advantages of the new process is the fact that excellent results are obtained when using the so-called low-pressure range. Low pressure, for the purpose of this disclosure, is meant to be between 15 and 150 p.s.i.g., and the maximum pressure is preferably such that the so-called low-pressure equipment can be used, e.g. Parr shakers, low-pressure hydrogenation stills, or similar inexpensive equipment.

The temperature used in this simple process may be as low as room temperature or even slightly below, and may be as high as about 10° below the boiling point of the reaction mixture at the pressure employed. Under such conditions, a substantial partial hydrogen pressure is insured in spite of the presence of the relatively high partial pressure of the reaction mixture. It will be understood by those skilled in the art that in practice at least about 20% of the total pressure in the reaction vessel should be hydrogen pressure to produce a satisfactory rate of hydrogen uptake.

The catalyst necessary for carrying out the present process is metallic palladium which may be used in any of its well-known catalytic forms such as sponge, shavings, chunks, coils, or fine particles; preferably, the metallic palladium is supported by a carrier, e.g. asbestos, bentonite, charcoal, kieselguhr, silica, alumina, and the like. When employing a carrier, the palladium is usually present in amounts of between 1.0% and 10.0% of the weight of the carrier. The active catalyst, i.e. the metallic palladium, is to be present in an amount of at least 0.05%, preferably in an amount of between 0.05% and 1.0% of the total weight of the reactants in the system. The process can be carried out in the presence of an inert solvent or an excess of the one or the other reactant, but ordinarily the new process is most advantageous when carried out by using substantially equimolar amounts of the reactants. The term "inert solvents" is meant to express that the solvent does not enter into any reaction with either one of the starting materials or the end product formed. The term "substantially equimolar amounts" is meant to indicate that neither one of the reactants is present in more than a 10% excess over the other. The carbonyl compound, expressed by the formula RCOR', may be a loweralkylaldehyde, e.g. acetaldehyde or heptanal, or it may be a diloweralkyl ketone such as acetone, methyl heptyl ketone, dibutyl ketone, and the like. The heterocyclic component may be pyridine or a pyridine substituted at the 2-, 3- or 4-position with a loweralkyl radical, e.g. methyl, propyl, isobutyl, or the like. The term "loweralkyl" is used herein to express saturated branched or straight carbon chains with 1–7 carbon atoms.

In a simple embodiment of the present invention, pyridine and acetone are mixed in substantially equimolar amounts and placed in a Parr shaker from which the air is first replaced by nitrogen, and the nitrogen is then replaced by hydrogen. After hydrogen is introduced at a pressure of about 50 p.s.i.g., the Parr shaker is put in motion and the mixture warmed to a temperature of about 75°. The reaction is completed when 4 molar equivalents of hydrogen are absorbed, at which time the catalyst is filtered off and the product solution is worked up in routine fashion such as by distillation.

To better understand the process of the present invention, reference is made to the following examples which are given as illustrations only and are not meant to limit the invention in any respect. In all these examples, all gas chromatographic results are reported on a water-free basis.

EXAMPLE 1

A mixture of 31.6 grams of pyridine, 19.4 grams of acetaldehyde and 2.3 grams (4.5% of weight of reactant) of a catalyst consisting of 5% palladium-on-carbon were placed in a Parr shaker and after the air was purged with nitrogen the nitrogen was replaced with hydrogen and hydrogenation was introduced in the usual manner. During the reaction the pressure varied between 29 and 61 p.s.i.g. and the temperature varied between 38° and 47° C. After 23 hours, hydrogen uptake was 95% of theory and the reaction was interrupted. The catalyst was filtered off and the resulting filtrate was analyzed by gas chromatography, showing 91.8% of N-ethylpiperidine.

EXAMPLE 2

A ratio of ingredients identical to that in Example 1 was placed in a one-gallon autoclave and the mixture was hydrogenated in the usual fashion at a hydrogen pressure of 120 p.s.i.g. and at a temperature range between 57° and 60° C. After 11 hours, hydrogen uptake was 91.5% of theory and the reaction was interrupted. The filtrate obtained after removal of catalyst showed 83.1% of N-ethylpiperidine by gas chromatographic analysis.

EXAMPLE 3

A repetition of Example 1, but using alumina as the catalyst carrier, a temperature between 48° and 53° C. and a pressure range of between 46 and 62 p.s.i.g., showed after 20 hours a hydrogen uptake of 89% of theory. The filtrate analyzed 83.0% of N-ethylpiperidine by gas chromatography.

EXAMPLE 4

In an experiment similar to that described in Example 1, hydrogen uptake was 98% of theory after 30 hours with 81.9% of N-ethylpiperidine in the filtrate. The filtered-off catalyst was washed with acetic acid and reused under similar conditions (47–53° C.; 47–63 p.s.i.g.) for a second batch of pyridine and acetaldehyde. After 30 hours the hydrogen uptake was 100% of theory. The resulting filtrate showed the presence of 83.8% of N-ethylpiperidine by gas chromatography of the filtrate. In a further use of the same catalyst under similar conditions, hydrogen uptake was 92% of theory after 41 hours with 84% of N-ethylpiperidine present in the filtrate.

EXAMPLE 5

In experiments similar to those described above operating within temperature ranges of 48° to 65° C. and pressure ranges of 25 to 61 p.s.i.g., but varying the amount of catalyst present between 0.17 and 0.75 percent of metallic palladium, as based on the combined amounts of acetaldeyde and pyridine, the hydrogen uptake varied between 85% and 98% of theory, producing filtrates analyzing between 77% (0.75% Pd, 24 hours) and 86.6% (0.2% Pd, 40 hours) of N-ethylpiperidine.

Using the equipment, pressure and ingredients as in Example 2, but varying the reaction temperature, the filtrate showed the following N-ethylpiperidine content as established by gas chromatography:

| | NEP |
|---|---|
| At 60° and 11 hours | 84.2 |
| At 70° and 12 hours | 80.8 |
| At 80° and 29 hours | 61.0 |
| At 90° and 44 hours | 49.6 |

At 100°, hydrogen uptake was so slow that after 16 hours only 13% of theory was absorbed, so that the reaction was interrupted. At room temperature but using a Parr shaker and a pressure range of 34–61 p.s.i.g. with no external heating or cooling, hydrogen uptake was 93% in 28 hours, showing 88% of N-ethylpiperidine in the filtrate.

EXAMPLE 6

A mixture of 31.6 grams of pyridine, 24.4 grams of acetone and 2.52 grams of a catalyst containing 5% palladium-on-carbon was placed in a Parr shaker and hydrogented under a pressure of 60–47 p.s.i.g. at a temperature range between 76° and 83° C. Hydrogen uptake was complete in 8 hours. The mixture was filtered with the filtrate separating into two phases. The top phase of 50.3 grams contained 48.0 grams of N-isopropylpiperidine, the bottom phase of 4.2 grams showed 0.1 gram of N-isopropylpiperidine which amounts to a combined total of 94.6% of the theoretical yield based on the starting material, pyridine. The identity of the product was established by boiling point and refractive index and was obtained in 99.9% purity by distillation.

EXAMPLE 7

By following the procedure of Example 6 but using an equimolar amount of 2-pentanone in place of acetone, the desired 2-piperidinopentane was obtained in a yield of 89.4% of theory. Distilling the product at 190–192° C. produced the desired material in a purity of above 99%. The refractive index (20° C.) was 1.4517 and the melting point of the picrate salt was found to be 92.5–94° C.

EXAMPLE 8

Replacing acetone in Example 6 with n-valeraldehyde produced, after 6.5 hours, a filtrate separating into two phases. The top phase contained 56.5 grams of N-n-pentylpiperidine; the bottom phase contained 0.2 gram of the same material, which amounts to a combined yield of 91.2% of theory. Upon distillation, the fraction boiling at 196–198° C. was identified as the desired material in a purity of 99%.

When in the above example n-heptylaldehyde was used, a yield of 91.5% of theory of N-n-heptylpiperidine was obtained by hydrogenation for 6 hours at 76–106° C.

EXAMPLE 9

A mixture of 37.2 grams of γ-picoline and 25.5 grams of acetone were hydrogenated in a Parr shaker at 62–46 p.s.i.g. at 84–90° C. in the presence of 2.82 grams of a 5% palladium-on-carbon catalyst. Hydrogen uptake was 99% of theory after 23 hours and the usual work-up of the filtrate produced a yield of 95.1% of the theoretical amount of N-isopropyl-γ-pipecoline with $n_D^{25}$ of 1.4418.

Replacing the above γ-picoline with α-picoline showed a hydrogen absorption of 93% of theory in 48 hours, to produce N-isopropyl-α-pipecoline with $n_D^{20}$ of 1.4514; the picrate melted at 174.5–176.5° C.

When using β-picoline as the starting material and working up the two-phased filtrate after 24 hours of hydrogenation, 93.7% of theory of N-isopropyl-β-pipecoline was obtained, showing after distillation an $n_D^{20}$ of 1.4469 and assaying 99.6% purity.

As will be seen from the above examples and disclosure, the ratio of reactants, the reaction temperature, the pressure employed, and the amount of catalyst, are not of great importance when these parameters are kept within the above indicated limits. Obviously, higher catalyst ratios and higher temperatures tend to increase the reaction speed but no particular improvement in yield or purity of the end products can be observed. The upper temperature limit is dictated by the ingredients and should ordinarily be kept at a temperature of at least 10° below the boiling point of the reaction mixture at the total pressure employed. It will be observed from the above examples that room temperature is satisfactory where reaction speed is not a prime concern. Where it is desired to use a high temperature for the process and the boiling point of one of the ingredients of the reaction mixture is relatively low, it is required that the hydrogen pressure in the reaction vessel is accordingly increased. Since room temperature and so-called low pressure, i.e. below 150 p.s.i.g., produce satisfactory results, no great advantage is seen in using costly pressure equipment and means for heating where the reaction proceeds at adequate speeds under those conditions.

The preferred range of catalyst amounts is based on the total amount of heterocyclic and carbonyl compounds used in the process. This catalyst amount must be at least 0.05% of said combined amount to produce satisfactory reaction speeds. The upper limit given above may be exceeded but no advantage is gained thereby. However, using the larger catalyst amounts may be desired when the same catalyst is intended to be used for several successive batch processes or, if desired, a catalyst ratio within the above range may be used initially, and for successive batches additional fresh catalyst may be added to the amount of catalyst which is being reused. As demonstrated above, several reuses of the catalyst produce satisfactory results. Obviously, the above process may be carried out in a continuous manner with only slight modifications in the equipment.

Others may practice the invention in any of the numerous ways which will be suggested to one skilled in the art by the present disclosure. All such practice of the invention is considered a part hereof, provided it falls within the scope of the appended claims.

I claim:

1. The process of preparing N-alkylated piperidines, comprising the steps of placing a mixture of a pyridine of the formula

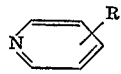

wherein R is selected from the group consisting of hydrogen and lower alkyl, and a carbonyl compound of the formula RCOR' wherein R is selected from the group consisting of hydrogen and lower alkyl and wherein R' is lower alkyl, in a closed system and treating said mixture with gaseous hydrogen in the presence of metallic palladium at a total pressure of at least 15 p.s.i.g. and at a temperature between room temperature and below M wherein M is the temperature at which the vapor pressure of the liquid reactants is equal to the total pressure in said closed system.

2. The process of claim 1 wherein said pyridine and said carbonyl compound are mixed in substantially equimolar amounts.

3. The process of claim 1 wherein said metallic palladium is present in an amount of at least 0.05% of the weight of the combined amounts of said pyridine and said carbonyl compound.

4. The process of claim 1 wherein said metallic palladium is supported by a catalyst carrier.

5. The process of claim 4 wherein said catalyst carrier is carbon and said metallic palladium is present in an amount of between 1.0% and 10.0% of the weight of said carrier.

6. The process of claim 1 wherein said carbonyl compound is acetone.

7. The process of claim 1 wherein said carbonyl compound is acetaldehyde.

References Cited

UNITED STATES PATENTS

| | | | |
|---|---|---|---|
| 2,045,574 | 6/1936 | Adkins et al. | 260—293.2 |
| 3,154,554 | 10/1964 | Seeger | 260—293.2 |
| 2,739,968 | 3/1956 | Sperber et al. | 260—293 |
| 2,833,776 | 5/1958 | Ruddy | 260—293.2 |

HENRY R. JILES, *Primary Examiner.*

ED LEWIS, *Assistant Examiner.*